(12) United States Patent
Kosaka

(10) Patent No.: US 7,553,009 B2
(45) Date of Patent: Jun. 30, 2009

(54) INK JET PRINTING INK FOR FORMING THREE-DIMENSIONAL PATTERNS, PROCESS FOR FORMING THREE-DIMENSIONAL PATTERNS USING THE SAME AND CLOTH HAVING THREE-DIMENSIONAL PATTERNS OBTAINED THEREBY

(75) Inventor: Takahiro Kosaka, Fukui (JP)

(73) Assignee: Seiren Company, Ltd, Fukui (JP)

( * ) Notice: Subject to any disclaimer, the term of this patent is extended or adjusted under 35 U.S.C. 154(b) by 393 days.

(21) Appl. No.: 10/507,882

(22) PCT Filed: Jul. 2, 2004

(86) PCT No.: PCT/JP2004/009421

§ 371 (c)(1),
(2), (4) Date: Sep. 15, 2004

(87) PCT Pub. No.: WO2005/005560

PCT Pub. Date: Jan. 20, 2005

(65) Prior Publication Data

US 2005/0117007 A1    Jun. 2, 2005

(30) Foreign Application Priority Data

Jul. 15, 2003  (JP)  .............................. 2003-274984

(51) Int. Cl.
   *C09D 11/00*  (2006.01)
(52) U.S. Cl. .................. 347/100; 106/31.13; 106/31.27
(58) Field of Classification Search ................. 347/100; 106/31.13, 31.27
   See application file for complete search history.

(56) References Cited

U.S. PATENT DOCUMENTS

| | | | |
|---|---|---|---|
| 2,606,124 A | 8/1952 | Schmutzler et al. | 106/24 |
| 4,043,820 A | 8/1977 | Landau | 106/21 |
| 6,156,111 A * | 12/2000 | Schwarz | 106/31.43 |
| 6,211,347 B1 * | 4/2001 | Sieber et al. | 534/801 |
| 6,471,896 B1 * | 10/2002 | Katsuki et al. | 264/78 |
| 2001/0022605 A1 * | 9/2001 | Suzuki et al. | 347/101 |
| 2003/0007052 A1 * | 1/2003 | Huang et al. | 347/101 |
| 2003/0105185 A1 * | 6/2003 | Goodbrand et al. | 523/160 |
| 2003/0198746 A1 * | 10/2003 | Dawson et al. | 427/372.2 |

FOREIGN PATENT DOCUMENTS

| | | |
|---|---|---|
| DE | 36 31 816 | 6/1987 |
| EP | 0 909 798 | 4/1999 |
| JP | 47-23709 | 7/1972 |
| JP | 57-154479 | 9/1982 |
| JP | 5-59312 | 3/1993 |
| JP | 10-298863 | 11/1998 |
| JP | 2000-096439 | 4/2000 |
| JP | 2000-96461 | 4/2000 |
| JP | 2000096439 A * | 4/2000 |

OTHER PUBLICATIONS

Thomson Derwent WPI English Abstract of Japanese Patent document No. JP 2000096461.
Thomson Derwent WPI English Abstract of Japanese Patent document No. JP 57154479.
Thomson Derwent WPI English Abstract of Japanese Patent document No. JP 5059312.
Patent Abstracts of Japan, Publication No. 2000-096439, Publication Date Apr. 4, 2000, "Etching Agent for Synthetic Textile Material and Etching Processing", T. Masahiko.
Patent Abstracts of Japan, Publication No. 10-298863, Publication Date Nov. 10, 1998, "Production of Embossed Pattern-Having Pile Fabric", Seto Yasutaro et al.

* cited by examiner

*Primary Examiner*—Stephen D Meier
*Assistant Examiner*—Laura E Martin

(57) ABSTRACT

The present invention provides an ink jet printing ink that can sufficiently be used for ink jet printing and can form clear three-dimensional patterns, a process for forming three-dimensional patterns using the ink and a cloth having three-dimensional patterns obtained thereby. That is, the present invention relates to an ink jet printing ink including guanidine carbonate and water, a process for forming three-dimensional patterns on cloth by applying the ink jet printing ink to cloth by ink jet printing and a cloth having three-dimensional patterns obtained thereby.

3 Claims, No Drawings

N JET PRINTING INK FOR FORMING
THREE-DIMENSIONAL PATTERNS,
PROCESS FOR FORMING
THREE-DIMENSIONAL PATTERNS USING
THE SAME AND CLOTH HAVING
THREE-DIMENSIONAL PATTERNS
OBTAINED THEREBY

CROSS REFERENCE TO RELATED
APPLICATIONS

This application is the U.S. National Stage of International Application PCT/JP2004/009421 filed Jul. 2, 2004 claiming priority from Japanese Patent Application No. 2003-274984 fled Jul. 15, 2003.

TECHNICAL FIELD

The present invention relates an ink jet printing ink for forming three-dimensional patterns, more specifically an ink jet printing ink capable of forming three-dimensional patterns on cloth. Also, the present invention relates to a process for forming three-dimensional patterns using the ink and a cloth having three-dimensional patterns obtained thereby.

BACKGROUND ART

In recent years, cloth having high functionality has been developed and use of such cloth for interior material in the automobile and building industries is increasing. High functional cloth, that is cloth having three-dimensional patterns, is cloth having an uneven surface and is attracting attention as high quality cloth having three-dimensional texture. Particularly, demands for the cloth as material for automobile seats and walls are increasing largely.

As a method for forming such three-dimensional patterns on cloth, conventionally, the method of physically forming uneven areas and the method of chemically forming uneven areas have been studied and employed.

Examples of the physical method are embossing, in which embossing is conducted by contact pressure of an engraving roll under heating at a high temperature, and schreinerizing. However, because the cloth is inserted between heated rolls under heavy pressure, the texture becomes extremely hard and the cloth becomes extremely flat. Also, there is the problem that metal luster due to the heat roll and thermal discoloring may occur.

An example of the chemical method is the method of treating with textile printing paste, in which a chemical that shrinks or reduces the weight of fiber is mixed when textile printing, as described in JP-B-47-23709. When a naphthol derivative is used as the chemical, there is the problem that the chemical tends to be applied unevenly, as the naphthol derivative has difficulty dissolving in water. When amine or an alkali metal hydroxide is used, there are the problems that foul odor is generated and harmful and hazardous effects are high. In order to solve these problems, JP-A-2000-96439 suggests mixing guanidine carbonate in textile printing paste as the chemical. Although there is the problem that the paste that is used must have alkali resistance, thereby limiting the type of paste that can be used, this method seems to be excellent in terms of reproducibility of uneven areas, environment and safety.

However, in all of the methods described above, patterns of the heat roll or textile printing screen must be formed first and there is the problem that accommodating for processing of small numbers is extremely difficult, in terms of time and cost. Also, because the textile printing paste containing the chemical has high viscosity, permeability to cloth is low and in the case that plush fabric having long pile length is used, the chemical does not reach the end of the pile and unevenness tends to be insufficient.

In order to solve such problems, in recent years, the method of forming three-dimensional patterns by applying a fiber shrinking agent to cloth by ink jet printing is attracting attention.

According to the ink jet printing method, patterns do not need to be formed on a heat roll or a textile printing screen and also, ink jet printing is excellent from economical and safety viewpoints, as the chemical can be applied to the cloth by spraying to only the necessary areas in the necessary amount. Furthermore, the obtained three-dimensional pattern is an extremely elaborate pattern that could not be obtained by the conventional method and therefore, is extremely useful.

An example of the method for forming three-dimensional patterns by ink jet printing is the method of shrinking pile by spraying a fiber shrinking agent from a nozzle, as described in JP-A-10-298863. In the above method, ink having high viscosity of 100 to 200 cps is used, but because the usual ink jet printing apparatus is for ink having low viscosity of approximately 1 to 10 cps, a new printing apparatus for high viscosity ink becomes necessary. Also, because the ink has high viscosity, clogging of the nozzle tends to occur. Furthermore, because permeability of the fiber shrinking agent to cloth is low, in the case that plush fabric having long pile length is used, the chemical does not reach the end of the pile and unevenness tends to be insufficient.

Furthermore, because the ink is transparent, the discharge conditions of the ink cannot be detected or examined and there is the problem that detection of discharge failure in the production line is delayed. Consequently, adding a colorant to the ink has been considered, but when a colorant is merely added to a fiber shrinking agent, coagulation and precipitation tend to occur and ultimately, discharge failure is caused.

As described above, the ink jet printing method is considered to be extremely useful as a method of forming three-dimensional patterns on cloth, but an ink for forming three-dimensional patterns, which can form clear patterns by unevenness and can be used for mass production, has not yet been found.

DISCLOSURE OF INVENTION

The object of the present invention is to provide an ink jet printing ink that can be sufficiently used for ink jet printing and can form clear three-dimensional patterns. Furthermore, the present invention provides a process for forming three-dimensional patterns using the ink and a cloth having three-dimensional patterns obtained thereby.

That is, the present invention relates to an ink jet printing ink comprising guanidine carbonate and water.

The ink jet printing ink preferably further comprises urea.

The ink jet printing ink preferably further comprises water-soluble colorant.

The ink jet printing ink preferably comprises 10 to 35% by weight of guanidine carbonate.

The ink jet printing ink preferably comprises at least one member selected from the group consisting of polyol, a polyol derivative and a surfactant to which ethylene oxide is added.

The water-soluble colorant is preferably a reactive dye.

The optical density of the maximum peak wavelength in the visible light range of the ink is preferably 2 to 30/g.

The present invention also relates to a process for forming three-dimensional patterns on cloth, which comprises applying the above ink jet printing ink to cloth by ink jet printing.

The cloth preferably comprises polyester fiber.

The present invention also relates to a cloth having three-dimensional patterns obtained by the above process for forming three-dimensional patterns.

BEST MODE FOR CARRYING OUT THE INVENTION

The embodiments of the present invention are described below.

The ink of the present invention is a functional ink jet printing ink capable of imparting three-dimensional patterns to cloth and is basically characterized in that guanidine carbonate is dissolved in water.

By using ink comprising guanidine carbonate and water, the ink can be discharged with stability over a long period of time in ink jet printing. Also, by applying the ink to cloth and then steaming and soaping the cloth, a clear three-dimensional pattern can be formed on the cloth.

Guanidine carbonate is used as a fiber decomposing agent, from the viewpoints that the aqueous solution thereof has low pH of 10 to 13 in comparison to other strong alkali such as caustic soda, operational safety and difficulty in corrosion of the equipment.

The reason that three-dimensional patterns are formed on cloth by an aqueous solution of guanidine carbonate, which is a weak alkali, is presumed to be because in the thermal treatment step conducted after applying the ink, the guanidine carbonate is decomposed into urea and ammonia and changed into strong alkali.

The concentration of guanidine carbonate is preferably 10 to 35% by weight, more preferably 15 to 30% by weight. When the concentration is lower than 10% by weight, uneven patterns may not sufficiently be obtained. On the other hand, when the concentration is higher than 35% by weight, because the solubility limit of guanidine carbonate to water becomes close, precipitate develops to cause clogging of the nozzle and stable discharge over a long period of time may not be possible.

When the ink jet printing ink is colorless and transparent, clogging of the nozzle and bleeding cannot be observed and determining whether or not the ink has been discharged with stability is extremely difficult. Therefore, a water-soluble colorant is preferably mixed to color the ink to the extent that the discharge conditions of the ink can be visually observed.

As the water-soluble colorant that can be used in the ink of the present invention, acidic dye, reactive dye and cationic dye are preferable, in view of low cost and variety. Of these, from the viewpoint that solubility to water is relatively high, reactive dye is preferable. Also, azo dye is preferable from the viewpoint that the ink can be colored by a small amount, as the dye has the structure of high optical density, and the viewpoint that the cloth is not colored when used together with guanidine carbonate, as alkali resistance of the dye is low. The content of the water-soluble colorant is preferably 0.001 to 0.1% by weight, more preferably 0.005 to 0.05% by weight. When the amount of the water-soluble colorant is less than 0.01% by weight, the ink color is too light that visually observing the discharge conditions of the ink tends to become difficult. When the amount is more than 0.1% by weight, the water-soluble colorant may precipitate and precipitate tends to cause nozzle clogging.

The optical density of the maximum peak wavelength in the visible light range of the ink of the present invention is preferably 2 to 30/g, more preferably 3 to 20/g. When the optical density is lower than 2/g, the ink color is light and visual observation and optical sensor observation of discharge conditions, such as nozzle clogging, tends to become difficult. When the optical density is more than 30/g, the amount of the water-soluble colorant may be excessive and as a result, precipitation of the dye occurs, which tends to cause clogging of the nozzle. The optical density can be measured by a commonly used spectrophotometer.

The ink of the present invention preferably contains urea, in order to dissolve the guanidine carbonate and the water-soluble colorant into water with stability. Urea is most suitable from the viewpoint that the influence to viscosity and surface tension, which are important for ink jet printing ink, is small. The content of urea is preferably 0.1 to 10% by weight, preferably 0.5 to 5% by weight. When the amount of urea is less than 0.1% by weight, the effects of urea as a dissolvent are poor and precipitation of the water-soluble colorant occurs, which tends to cause clogging of the nozzle. When the amount is more than 10% by weight, uneven patterns on cloth, which is the object of the present invention, may not sufficiently be obtained.

The ink of the present invention preferably contains at least one member selected from the group consisting of polyol, a polyol derivative and a surfactant to which ethylene oxide is added, from the viewpoint of preventing cavitation of the nozzle. The content thereof is preferably 0.1 to 10% by weight, more preferably 0.5 to 5% by weight. When the amount is less than 0.1% by weight, the effect of preventing cavitation of the nozzle is low and the ink tends to easily causes cavitation. When the amount is more than 10% by weight, the viscosity of the ink becomes high and discharging the ink from the nozzle tends to become difficult.

Examples of the polyol and polyol derivatives that can be used in the present invention are glycerin, diethylene glycol, diethylene glycol monomethyl ether, diethylene glycol monobutyl ether, triethylene glycol, triethylene glycol dimethyl ether, triethylene glycol monomethyl ether, propylene glycol, propylene glycol monomethyl ether, dipropylene glycol, tripropylene glycol, trimethylene glycol, polyethylene glycol and polyethylene glycol dimethyl ether.

The surfactant to which ethylene oxide is added that can be used in the present invention is preferably a nonionic or cationic surfactant, because an anionic surfactant may be problematic in compatibility with guanidine carbonate and foamability.

Examples of nonionic surfactants to which ethylene oxide is added are ether-type nonionic surfactants such as polyoxyethylene alkyl ether, ether ester-type nonionic surfactants such as polyoxyethylene glycerin fatty acid ester and ester-type nonionic surfactants such as polyethylene glycol fatty acid ester.

Examples of cationic surfactants to which ethylene oxide is added are ethylene oxide adducts of aliphatic amine salt and aliphatic quaternary ammonium salt.

Because the ink of the present invention is for ink jet printing, the surfactant preferably has low viscosity of number average molecular weight of at most 5000. When the number average molecular weight is more than 5000, viscosity of the ink becomes high and discharge stability of the ink tends to become poor.

Of the above polyol, polyol derivative and surfactant to which ethylene oxide is added, propylene glycol is more preferable from the viewpoint that operational safety is excellent. Also, from the viewpoint that stability in an alkali aqueous solution is high, ethylene oxide adducts of aliphatic quaternary ammonium salt are more preferable.

The ink jet printing ink of the present invention preferably has viscosity of 1 to 10 cps, more preferably 1 to 5 cps, at 25° C. When the viscosity is lower than 1 cps, the discharged ink drops split when flying and sharpness of the uneven pattern tends to be poor. When the viscosity is more than 10 cps, discharging the ink from the nozzle tends to become difficult, as the viscosity is high.

The ink jet printing ink of the present invention is applied to recording mediums such as cloth and film and forms three-dimensional patterns. Of these, cloth is preferable, from the viewpoint that surface area is large because cloth is made of fiber and therefore, three-dimensional patterns can be easily formed.

The cloth is not particularly limited and examples are woven fabric, knit fabric, plush fabric and non-woven fabric. Examples of material of the cloth are materials such as polyester and wool. Of these, cloth made of polyester fiber is preferable, from the viewpoints that polyester cloth has high versatility and can be used not only in the fashion industry but also in the automobile and building industries for industrial material such as interior material.

Also, from the viewpoint that patterns by unevenness can be formed clearly, the thickness of the fiber that constitutes the cloth is preferably at most 2 decitex.

The ink jet printing ink of the present invention is preferably applied in an amount of 10 to 100 g/m$^2$ per unit area of the recording medium. When the amount of ink that is applied is less than 10 g/m$^2$, sufficiently obtaining patterns by uneven areas tends to be difficult. When the amount of ink is more than 100 g/m$^2$, bleeding of the ink occurs and the patterns created by the uneven areas tends to lack sharpness. Also, the amount of guanidine carbonate that is applied is preferably 1 to 30 g/m$^2$. When the amount of guanidine carbonate that is applied is less than 1 g/m$^2$, sufficiently obtaining patterns by uneven areas tends to be difficult. When the amount is more than 30 g/m$^2$, the amount becomes excessive and as a result, not only does cost become high but also holes tend to open, depending on the cloth.

In order to prevent bleeding of the ink and excessive permeation to the cloth, the cloth is preferably subjected in advance to pre-treatment of applying a solution containing an ink receiving agent.

Examples of the ink receiving agent are pastes such as sodium alginate, carboxymethyl cellulose, polyvinyl alcohol, methyl cellulose and starch. Of these, carboxymethyl cellulose is preferable from the viewpoint that chemical resistance and alkali resistance are excellent. The amount of the ink receiving agent that is applied is preferably 2 to 20 g/m$^2$. When the amount is less than 2 g/m$^2$, ink receptivity is poor and the ink tends to blur and bleed through the cloth. When the amount is more than 20 g/m$^2$, because the cloth becomes hard, transportability in the ink jet printer tends to become poor and the receiving agent tends to come off the cloth when handling.

Furthermore, the pre-treatment solution can contain a pH adjuster, a light fastness improving agent, an antioxidant and an anti-reducing agent when necessary.

Examples of the method for applying the ink receiving agent are the coating method, the screen method and the dip nip method, but the method is not particularly limited.

After the ink of the present invention is applied to the cloth by ink jet printing, thermal treatment is conducted. By thermally treating the cloth, the fiber is decomposed and unevenness appears.

The thermal treatment is preferably conducted under conditions of 160 to 190° C. for approximately 10 minutes. When the temperature is lower than 160° C., patterns by uneven areas may not sufficiently be obtained and when the temperature is higher than 190° C., decomposition of the fiber progresses too suddenly that reproducibility tends to be difficult to obtain. Thermal treatment can be dry thermal treatment or wet thermal treatment. Wet thermal treatment is preferable from the viewpoints that the uneven patterns that are formed are favorable and that when simultaneously forming three-dimensional patterns and dying as described below, favorable coloring properties are also obtained.

After thermal treatment, cleaning is preferably conducted in order to remove the ink receiving agent that remains on the cloth, dye that did not stick to the cloth and decomposed matter of fiber from the cloth. As the method for cleaning, the commonly used reduction cleaning method using hydrosulfite, a surfactant and soda ash is employed.

Also, when conducting reduction cleaning, weight reducing treatment is preferably conducted.

By conducting weight reducing treatment, in the case that areas remain in which decomposition of fiber is insufficient, such undecomposed fiber can be removed and uneven areas having even more clearness can be formed.

The conditions for weight reducing treatment are not particularly limited, but treatment is conducted at a temperature of 70 to 90° C. for 10 to 60 minutes using 1 to 5 g/L of a weight reducing accelerator and 2 to 15 g/L of caustic soda (granulate).

Examples of the weight reducing accelerator are cationic surfactants such as aliphatic amine salt, quaternary ammonium salt of aliphatic amine, aromatic quaternary ammonium salt and heterocyclic quaternary ammonium salt.

The ink jet printing ink of the present invention can be used together with an ink jet printing ink for coloring the cloth, which is obtained by dispersing or dissolving dispersion dye, pigment, acidic dye, direct dye, reactive dye or cation dye in water. That is, the ink jet printing ink of the present invention and coloring ink are discharged from different nozzles and by being mixed on the cloth, patterns, for example uneven areas, colored areas and areas that are both uneven and colored, can be formed freely on the same cloth.

The ink jet printing device used for the process for forming three-dimensional patterns of the present invention can be any device that does not heat the ink, in order to prevent decomposition of guanidine carbonate by heat. Examples are continuous-type devices such as the charged modulation type, the charged spraying type, the micro dot type and the ink mist type and on-demand type devices such as the piezo conversion type and the electrostatic suction type. Of these, from the viewpoint that ink discharge stability and continuous discharge properties are excellent and that the head can be manufactured relatively cheaply, the piezo type is preferable.

In this way, by using the ink jet printing method as the method for forming three-dimensional patterns, the depth and width of the unevenness can be adjusted freely. Also, there are no limitations in pattern, such as in the case of an textile printing pattern, and elaborate patterns created by uneven areas can be expressed freely in increments of 1 pixel. Furthermore, because the depth of the uneven areas can be changed gradually, in addition to designs that were possible by the conventional roll and screen methods, gradation patterns can be formed by the uneven areas. The process of the present invention is also excellent compared to the conventional method in view of the environment, as a large amount of waste water is not produced, as well as in terms of time, cost and workability.

Hereinafter, the present invention is explained in detail based on Examples and Comparative Examples, but not limited thereto. In Examples and Comparative Examples, "part(s)" represent "part(s) by weight".

EXAMPLE 1

1 part of urea, 0.02 part of C. I. Reactive Red 24, 25 parts of guanidine carbonate, 2 parts of propylene glycol and 71.98 parts of deionized water were mixed and stirred for 2 hours. Then, the mixture was filtrated in vacuum with Toyo filter paper No. 5A and vacuum deaerated to obtain ink jet printing ink A (pH 11.8).

EXAMPLE 2

1 part of urea, 0.02 part of C. I. Reactive Red 24, 25 parts of guanidine carbonate, 2 parts of a surfactant (ethylene oxide adduct of aliphatic quaternary ammonium salt, number average molecular weight: 800) and 71.98 parts of deionized water were mixed and stirred for 2 hours. Then, the mixture was filtrated in vacuum with Toyo filter paper No. 5A and vacuum deaerated to obtain ink jet printing ink B (pH 11.5).

EXAMPLE 3

1 part of urea, 0.02 part of C. I. Reactive Red 24, 15 parts of guanidine carbonate and 83.98 parts of deionized water were mixed and stirred for 2 hours. Then, the mixture was filtrated in vacuum with Toyo filter paper No. 5A and vacuum deaerated to obtain ink jet printing ink C (pH 11.6).

EXAMPLE 4

25 parts of guanidine carbonate and 75 parts of deionized water were mixed and stirred for 2 hours. Then, the mixture was filtrated in vacuum with Toyo filter paper No. 5A and vacuum deaerated to obtain ink jet printing ink D (pH 11.8).

COMPARATIVE EXAMPLE 1

10 parts of benzyl alcohol, 0.02 part of C. I. Reactive Red 24 and 90 parts of deionized water were mixed and stirred for 2 hours. Then, the mixture was filtrated in vacuum with Toyo filter paper No. 5A and vacuum deaerated to obtain ink jet printing ink E (pH 7.5).

EXAMPLES 5 to 8 and COMPARATIVE EXAMPLE 2

Carboxymethyl cellulose (FINE GUM HEL-1, available from Dai-ichi Kogyo Seiyaku Co., Ltd.) was applied to polyester plush fabric (fiber thickness 1 decitex) so that the amount applied was 2 g/m², to form an ink receiving layer. The polyester plush fabric was printed on with the inks A to E obtained in Examples 1 to 4 and Comparative Example 1 under the following ink jet printing conditions. <Conditions for Ink Jet Printing>
Printing device: On-demand type serial scanning ink jet printing device (piezo conversion type)
Nozzle diameter: 50 μm
Driving voltage: 100 V
Frequency: 5 kHz
Resolution: 360 dpi
Amount applied: 20, 40, 60, 80, 100 g/m²
Printed pattern: matrix pattern for each of the amounts applied After the printed cloth was dried, the cloth was subjected to wet thermal treatment at 175° C. for 10 minutes. Then, the cloth was subjected to reduction cleaning, drying and brushing.

Furthermore, in the reduction cleaning step, weight reducing treatment was conducted. The conditions for weight reducing treatment are as follows.

| <Conditions for weight reducing treatment> | |
|---|---|
| Treatment liquid: | |
| caustic soda (granulate) | 3 g/L |
| weight reducing accelerator | 2 g/L |
| (Marselin PES, quaternary ammonium salt type cationic surfactant, available from Meisei Chemical Works, Ltd.) | |
| hydrosulfite | 2 g/L |
| Treatment temperature: 80° C. × 10 minutes | |

After weight reducing treatment, the cloth was neutralized and then washed with water.

The viscosity, ink discharge properties, generation of precipitate and ink optical density of the inks A to E obtained in Examples 1 to 4 and Comparative Example 1 and the clearness of the pattern created by uneven areas of the cloth were measured, checked and evaluated by the following methods. The results are shown in Table 1.
Ink viscosity: BL-type viscometer made by Tokyo Keiki, BL rotor, 60 rpm, 25° C.
Ink discharge properties: One dot pattern was continuously printed for 10 minutes on ordinary paper and disorder of the dots and clogging were observed.
○: No discharge failure in 10 minutes
Δ: No clogged nozzles but some nozzles having discharge failure
×: Clogged nozzles
Ink precipitate: The ink was left at room temperature for 1 week and then filtrated in vacuum with Toyo filter paper No. 5A. The amount of residue was visually observed.
○: No residue
Δ: Some residue
×: Large amount of residue
Ink optical density: Spectrum measurement of the ink in a range of 400 nm to 700 nm was conducted using UV2200 made by Shimadzu Corporation and the optical density at the maximum absorption peak wavelength was measured.
Clearness of pattern created by uneven areas: The clearness was visually observed.
○: For all amounts applied, depressions are deep and unevenness is clear at the pattern edge.
Δ: For amounts applied of 20 and 40 g/m², depressions are rather shallow and clearness at the pattern edge is slightly inferior.
×: For all amounts applied, depressions are shallow and unevenness is unclear.

TABLE 1

| | Ex. 5 | Ex. 6 | Ex. 7 | Ex. 8 | Com. Ex. 2 |
|---|---|---|---|---|---|
| Ink | A | B | C | D | E |
| Ink viscosity (cps) | 1.8 | 1.8 | 1.5 | 1.7 | 10 |
| Ink discharge ability | ○ | ○ | ○-Δ | ○-Δ | × |
| Ink precipitate | ○ | ○ | ○ | ○ | ○ |
| Ink optical density (/g) | 4 | 4 | 4 | 0 | 4 |
| Clearness of uneveness | ○ | ○ | Δ | ○ | × |

The inks A to D obtained in Examples 1 to 4 were excellent in discharge properties. Particularly, the inks A and B obtained in Examples 1 and 2 were excellent in discharge properties and clearness of the patterns created by uneven areas and formed excellent three-dimensional patterns. The ink D obtained in Example 4 had no problems regarding discharge properties and clearness of the patterns created by uneven areas. However, because the ink was transparent, the discharge conditions were somewhat difficult to observe and workability decreased slightly.

INDUSTRIAL APPLICABILITY

According to the present invention, an ink jet printing ink is provided, which can sufficiently be used for ink jet printing and can form clear three-dimensional patterns. Furthermore, a process for preparing clear three-dimensional patterns and a cloth having clear three-dimensional patterns can be provided.

The invention claimed is:

1. A process comprising applying an ink jet printing ink to a cloth comprising polyester fiber by ink jet printing, wherein said ink jet printing ink comprises:

guanidine carbonate, urea, at least one member selected from a group of polyol, a polyol derivative and a surfactant to which ethylene oxide is added, a water-soluble colorant, and water, wherein said water-soluble colorant is a reactive dye, wherein of said inkjet printing ink the optical density at the maximum peak wavelength in the visible light range is 2 to 30 units per gram of ink (/g), and wherein the polyester fiber of a portion of the cloth to which the ink jet printing ink is applied is decomposed to form three-dimensional patterns on the cloth.

2. The process of claim 1, wherein said ink jet printing ink comprises 10 to 35% by weight of guanidine carbonate.

3. The process of claim 1, wherein said ink jet printing ink is used together with another ink jet printing ink, said other inkjet printing ink is for coloring the cloth.

* * * * *